June 18, 1963
B. H. TRIFFLEMAN
3,094,411
METHOD AND APPARATUS FOR THE EXTRACTION OF
ZINC FROM ITS ORES AND OXIDES
Filed April 8, 1959
2 Sheets-Sheet 1
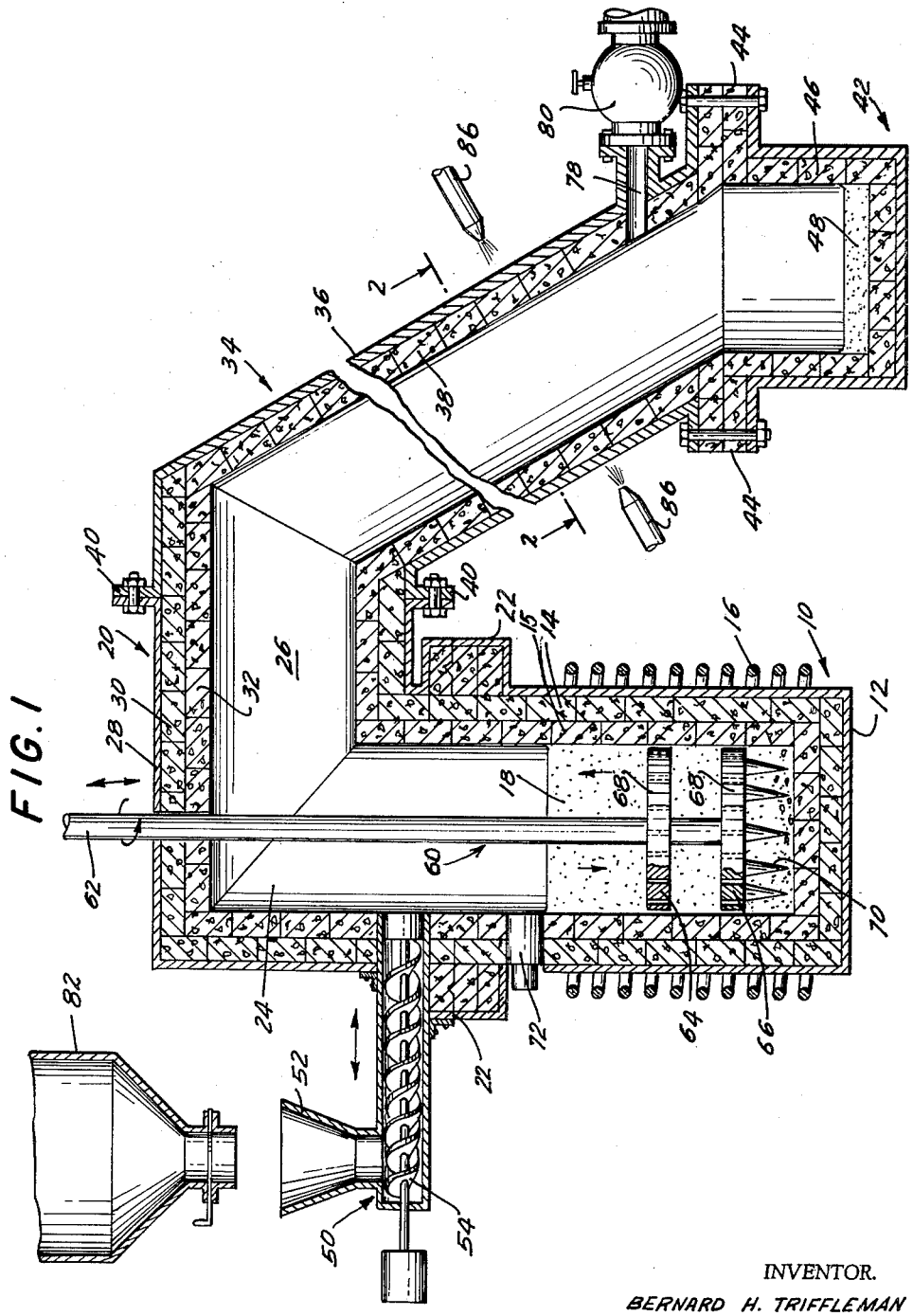
INVENTOR.
BERNARD H. TRIFFLEMAN
BY
Amster + Levy
ATTORNEYS INVENTOR.
BERNARD H. TRIFFLEMAN
BY
Amster & Levy
ATTORNEYS ns # United States Patent Office 3,094,411
Patented June 18, 1963

3,094,411
METHOD AND APPARATUS FOR THE EXTRACTION OF ZINC FROM ITS ORES AND OXIDES
Bernard H. Triffleman, 14—26 Chandler Drive,
Fair Lawn, N.J.
Filed Apr. 8, 1959, Ser. No. 804,893
6 Claims. (Cl. 75—86)

The present invention relates to improvements in metallurgical processes and apparatus, and in particular to a novel and improved pyrometallurgical process and apparatus for the extraction of zinc from its ores, oxides, and residues, and for the production of copper-based zinc alloys.

According to conventional processes in use today for extracting zinc from sphalerite ores, the sphalerite is first concentrated and roasted to convert the sulfides to oxides. The zinc is then extracted through either pyrometallurgical or hydrometallurgical-electrochemical processes. The pyrometallurgical processes include both the batch method and continuous distillation method. Both of these pyrometallurgical methods, however, employ the same basic chemical reaction in which carbon is reacted with zinc oxide under heat to yield zinc vapor and carbon monoxide gas.

Customarily, in following the batch-type distillation process, the roasted and sintered ore and coal blend is poured into a large number of clay-ceramic retorts which are heated externally to effect the chemical reaction. These retorts are poor heat conductors and further are structurally fragile. Consequently, they are made of small size and therefore a great number of such retorts are required when large tonnages of zinc are to be distilled. As many as 11,000 ceramic retorts are known to be required at one time by a single plant. One retort lasts for about forty days and approximately one and one third retorts are consumed for each ton of zinc produced. The distillation condensers are also made of clay-ceramic material, and breakage per day averages approximately 15 percent. The breakage of these ceramic parts is so prevalent that zinc distillation plants find it expedient to establish a special division known as a "pottery," the sole function of which is to manufacture these pieces of ceramic equipment to maintain the supply of retorts and condensers.

It will thus be appreciated that the fragile equipment utilized in the conventional batch-type distillation process makes such process expensive and cumbersome. In addition, the poor heat conductivity of the retorts, the endothermic character of the over-all reaction, and the length of time required by such reaction (24 to 48 hours), require the consumption of huge quantities of fuel. Thus, rather than selecting the sites of distillation plants at or near the location of consumer markets or ore deposits, the location of cheap fuel supplies determines the sites of such plants.

In both of the conventional batch and continuous distillation processes, the condensation of the zinc vapors presents a serious problem of oxidation. The zinc vapors produced are mixed with at least their own volume of carbon monoxide as well as carbon dioxide and dust. The carbon dioxide reacts with the zinc vapor to form very fine particles of zinc oxide. This very fine zinc oxide powder and the other fine dust present, act as a cloud of nuclei upon which additional zinc vapor may condense to form tiny zinc droplets. The surfaces of these tiny zinc droplets are then further oxidized by the same reaction with carbon dioxide, which prevents these particles from coalescing. This presents a serious problem in efficiency, since in the usual operation approximately 2.3 percent of the zinc is lost as exhaust fume, and 20 percent of the distillate is converted into the so-called "blue powder" which is essentially solidified zinc droplets with oxide coatings. The latter product must then be redistilled to recover the pure metal.

Broadly, it is an object of the present invention to provide a novel method for the extraction of zinc from its ores, and an improved distillation apparatus for performing the process, which method and apparatus eliminate or minimize the aforementioned disadvantages of the conventional distillation processes. Specifically the method and apparatus of the invention are intended to simplify the manner of extracting the zinc from its ores, eliminate the necessity of employing fragile ceramic retorts, reduce the required amount of fuel consumed, and minimize the oxidizing problems inherent in conventional condensing methods.

An additional object of the invention is to provide a unique method of producing copper-based zinc alloys directly from zinc ores.

In accordance with the present invention, the novel zinc extraction method comprises the following fundamental steps:

(1) The zinc oxide concentrate is mixed with fine coal in an amount by weight equivalent to from one to two times the amount of carbon theoretically required to reduce the oxide according to the following reaction:

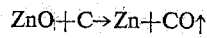

$$ZnO + C \rightarrow Zn + CO\uparrow$$

(2) The mixture of zinc oxide and fine coal is now poured into a melt of copper or copper alloy such as brass, and is physically submerged beneath the surface of the molten copper by suitable apparatus. The melt is maintained at a temperature between 1900° F. and 2200° F., so that reduction occurs rapidly, and alloying of the copper and zinc immediately results. The unreducible gangue is allowed to rise to the surface and is skimed off.

(3) The resulting alloy is then heated at atmospheric pressure or below, and the greater portion of the zinc is distilled under neutral or reducing conditions, condensed and recovered as massive metal. The copper is then recovered and re-used under step (2), to repeat the cycle.

Additional objects and advantages of the invention will be apparent during the course of the following detailed description when taken in connection with the accompanying drawings which illustrate a form of apparatus which may be advantageously employed in carrying out the invention, and in which:

FIGURE 1 is a vertical section through a zinc distillation apparatus made in accordance with the invention, with portions broken away or shown schematically for convenience of illustration;

Figure 3:
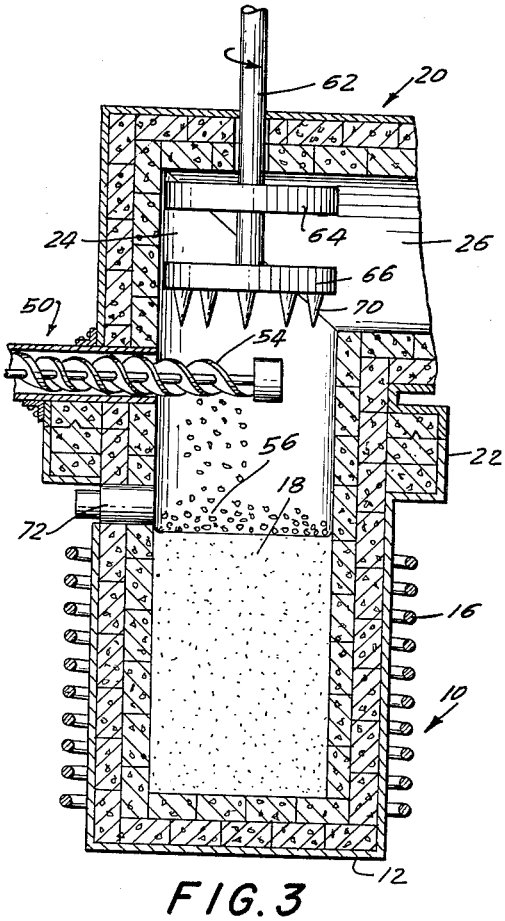
FIGURE 3 is a partial sectional view of the apparatus shown in FIGURE 1 with the plunger unit thereof raised to a retracted position and the screw conveyor shown feeding the zinc-carbon mixture into the copper melt.

Referring in detail to the drawings, and in particular to FIGURE 1, it will be observed that the distillation apparatus includes a melting pot 10 comprising a metal jacket 12, the interior of which is lined by an outer refractory brick 14 made of zirconia, magnesia, or the like, which in turn is lined by inner bricks 15 made of material such as silicon carbide or dense carbon. The melting pot 10 is surrounded by heater coils 16 which may be induction coils, resistance coils, or equivalent heating means for melting a supply of copper 18 and maintaining the copper in a molten state.

The melting pot 10 communicates with the upper condenser portion 20 of the apparatus and is removably secured thereto by a close-fitting joint 22 which provides an air-tight seal but at the same time is capable of being disassembled so that the melting pot may be removed from the remainder of the apparatus when desired.

The upper condenser portion 20 comprises a vertical section 24 and a horizontal section 26. The upper condenser portion 20 has a steel jacket 28 having an interior lining of insulating bricks 30 which in turn have a lining of dense carbon bricks 32. The horizontal section 26 of the upper condenser portion 20 communicates with the downwardly-inclined lower condenser portion 34, the latter having a cast iron shell or jacket 36 lined with dense carbon bricks 38. The carbon bricks act to reduce any carbon dioxide which may be formed during the process or any oxygen which may leak into the apparatus.

The lower condenser portion 34 is secured to the upper condenser portion 20 by a flange joint 40 and terminates in a zinc receiver pot 42 to which it is secured by another flange joint 44. The zinc receiver pot is lined with carbon bricks 46, and is adapted to receive zinc in massive metal form as indicated at 48, as the result of the distillation process.

A screw conveyor 50 is mounted on the vertical section 24 of the upper condenser portion 20, and communicates with the interior thereof for carrying a supply of the zinc oxide-coal mixture to the melting pot 10. A hopper 52 communicates with the interior of the conveyor and is sized to feed a measured amount of the mixture thereto. The screw portion 54 of the conveyor 50 is capable of moving into and out of the interior of the copper condenser portion 20 in order to selectively feed the mixture supplied by the hopper 52. FIGURE 1 shows the screw 54 in a retracted, non-feeding position, while FIGURE 3 shows the screw 52 advanced into the interior of the upper condenser and dropping the powdered mixture 56 to the surface of the copper melt 18.

A plunger apparatus 60 is movably mounted in the top wall of the upper condenser horizontal portion 26 so that it moves downwardly into the interior of the vertical portion 24 and can also extend into the melting pot 10. The plunger apparatus 60 includes a shaft 62 which carries a pair of plunger plates 64 and 66 at its bottom end. The upper end of the plunger shaft 62 is coupled to suitable motor means (not shown), capable of raising and lowering, as well as rotating, said shaft 62. Both the upper and lower plunger plates 64 and 66 are provided with a series of through apertures 68, shown in FIGURE 1, which are equally spaced about the shaft 62. In addition, the lower plunger plate 66 carries a plurality of depending prongs 70 which stir the melt when the plunger plate is lowered and rotated.

Figure 4:
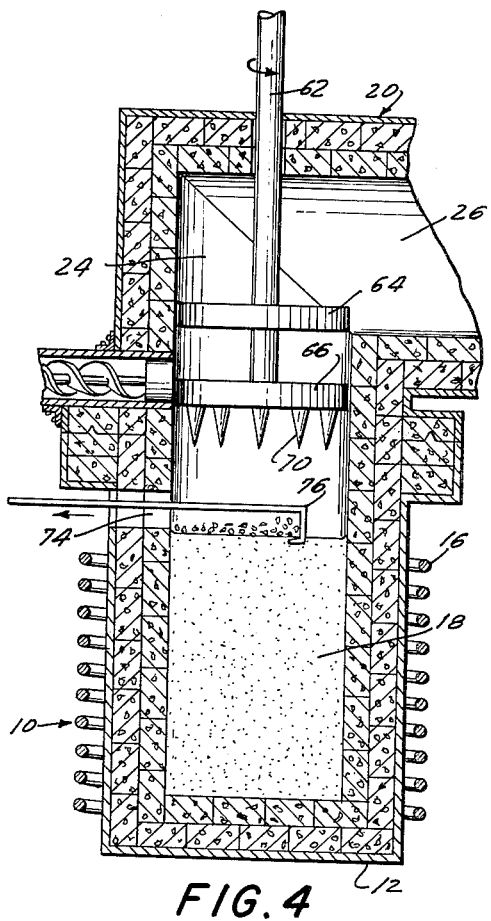
FIGURE 4 is a partial sectional view similar to FIGURE 3, but showing the gangue or residue being removed from the surface of the molten copper.

A removable plug 72 is mounted in the melting pot 10 immediately above the level of the copper melt 18 contained therein. As shown in FIGURE 4, the plug 72 can be removed, when desired, to uncover an opening 74 which provides access to the surface of the copper melt 18 from the exterior of the apparatus. After the ore and coal mixture is added to the copper melt, the plug 72 may be removed, and a rake 76 or other suitable tool inserted through the opening 74, as shown in FIGURE 4, to skim the slag and residue from the surface of the melt and remove it through said opening 74.

Mounted in the lower end of the lower condenser 34 is an exhaust port 78 through which uncondensable gases may be drawn off and to which suitable vacuum equipment may be connected during the distillation process. A one-way valve 80 is contained within the exhaust port 78 for use when distilling the zinc under atmospheric pressure.

As is shown in FIGURE 1, the apparatus also includes a storage bin 82 which serves as a receptacle for a large supply of the ore mixture and feeds the same, when required, to the hopper 52.

Figure 2:
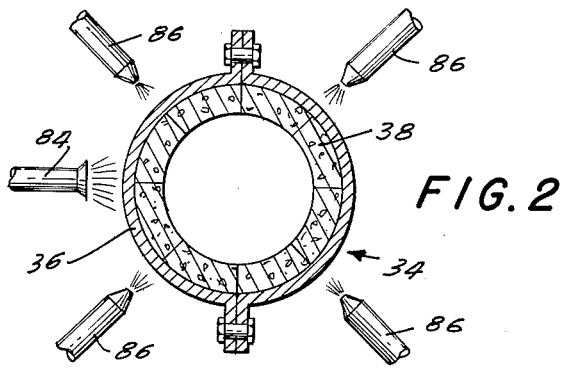
FIGURE 2 is a section taken along line 2—2 of FIGURE 1.

As shown in FIGURE 2, a series of gas pipes 86 surround the lower condenser 34, so that the condenser may be heated to maintain the inside temperature between the melting and boiling point of zinc. In addition, the lower condenser may also have associated with it one or more water jets 84 to prevent the temperature from getting high enough to cause the metal shell to fail.

After the conventional roasting and sintering steps, the ore is ground to minus 200 mesh and mixed with minus 200 mesh grade coal which is low in ash, sulfur and volatiles. The mixture is then sintered slightly to agglomerate the particles to approximately between ten and twenty mesh, or, as an alternative, the mixture may be briquetted and then deagglomerated to approximately the same range, namely between ten and twenty mesh. The mixture is then deposited in the storage bin 82 for feeding to the hopper 52 and the screw conveyor 50, from whence it may be fed to the melting pot.

In the second step of the process, the zinc oxide is reduced to zinc which is immediately absorbed into an alloy which lowers the vapor pressure of the zinc so that most of it is retained in the alloy. Specifically, this step is accomplished as follows: A melt of copper is made, as indicated at 18 in FIG. 1, and the plunger shaft 62 is raised to carry the plunger plate 64 and 66 upwardly well above the surface of the copper melt as well as above the level of the screw conveyor 50. The screw conveyor is then advanced into the interior of the furnace and the screw 52 rotated to drop a predetermined amount of ore-carbon mixture to the melt, in the manner shown in FIG. 3. The screw conveyor is now retracted and the plunger shaft 62 lowered so that the plates 64 and 66 depress the ore-carbon mixture beneath the surface of the copper melt. The plunger is rotated from time to time to facilitate mixing, prevent agglomeration of the powders, and liberate the carbon monoxide gas generated by the reaction of the zinc oxide with the carbon content of the coal. The gases escape around the edges of the plungers 64, 66 and through the apertures 68 in the plungers, and are drawn off through the exhaust port 78 from whence they may be routed to the steam or sintering plant to be used as additional fuel.

Most of the zinc liberated in the reaction is immediately absorbed by the copper melt forming a brass alloy and is retained as such. Some of the zinc is volatilized and rises as zinc vapor, being condensed to zinc metal in the condensers 26 and 34 and caught in the zinc receiver 42.

The aforementioned reaction is based upon the fact that at 1900° F. and above carbon will react rapidly with zinc oxide to form zinc and carbon monoxide, while at temperatures up to 2200° F. the vapor pressure of zinc in a 15% brass is relatively low. For example, a brass alloy containing 15% zinc when heated to 2200° F. and stirred, will distill out only 18% of the contained zinc in one hour, leaving a 12.7% brass. A temperature of 3200° F. is required over a period of five hours in order to bring down the zinc content of a brass to 2% at normal pressures. As the zinc content of the brass increases, the zinc vapor pressure will, of course, also increase. Thus a 50% zinc brass when heated to 2000° F. for one-half hour without stirring will distill off 29% of the zinc.

In the present method, the copper melt is maintained at a temperature above 1900° F. and below 2200° F. Thus, the zinc oxide and carbon will react rapidly, yielding zinc which will form a brass alloy with the copper and most of the zinc will be retained during the process because of its low vapor pressure at the operating temperatures.

As a specific example of this step, a mixture of zinc ore and carbon was deposited in a melt of copper maintained at a temperature of 2150° F. at the start of the operation and gradually lowered to a temperature of 2050° F. at the end of the reaction period. Equal portions of the mixture were added at five minute intervals over a period of forty-five minutes and a fifteen minute interval allowed to elapse after the final addition. It was found that 85% of the zinc was recovered in a brass containing 14.1% zinc, that 5% of the input zinc remained in the ore residue, and that only 10% of the zinc had distilled.

On the other hand, when attempts were made to produce alloys containing appreciably more than 15% zinc, a greater portion of the zinc was distilled and the reduction reaction time increased. For example, when a larger amount of the ore-carbon mixture was added to the copper melt maintained at 2150° F., the operation took 65 minutes, at which time the melt was poured. An alloy containing 18.4% zinc was obtained, representing 54.2% of the input zinc, while 20% of the zinc had distilled and 25% remained as unreacted oxide.

In the third step of the process, the zinc is distilled off and is recovered as massive metal. As was previously indicated, one of the chief problems in condensing zinc is caused by the admixture of zinc vapors with carbon monoxide and carbon dioxide. As zinc droplets condense, the carbon dioxide tends to oxidize the surfaces so that normally about 20% of the zinc is formed as "blue powder" which must be reprocessed. Even if the oxidation by carbon dioxide is disregarded, condensation from the diluent gases is still somewhat difficult and metal baths and showers have been proposed for condensing the vapors, with additional showers for cleaning the vapors passing through the first showers. Such expedients minimize the effects of the difficulty without eliminating the cause, and further are complicated and expensive.

In accordance with the present invention, pure zinc is vaporized and diluent and oxidizing gases are eliminated, thereby reducing the production of "blue powder" to an absolute minimum while maintaining a simple and economical condensation procedure and apparatus. Thus, following this procedure, after the reduction step is concluded, the plunger plates 64 and 66 are raised above the level of the screw conveyor 50, and the ore residue floating on the surface of the copper melt is skimmed off and removed through the opening 74, as shown in FIGURE 4. A vacuum apparatus is then attached at the exhaust port 78, and the temperature of the copper melt is again raised to 2150° F. to distill the zinc contained therein under the lowered pressure produced by the vacuum apparatus. A constant vaporization of zinc from the surface of the melt thereby results.

The plunger plates 64 and 66 are rotated and reciprocated constantly during this operation to maintain a constant temperature and composition of the melt during the distillation. The stirring action is not essential, but is useful in speeding up the reaction. The pure zinc is then easily condensed, and the production of "blue powder" is so small as to be negligible. For example, in one test, when the alloy was heated to 2150° F. and stirred under the reduced pressure, the zinc content of the alloy was brought down from 14.1% zinc to 2.2% in two hours, and the zinc was recovered in a massive form.

Having described the method of the invention generally, specific examples will now be given, illustrating several manners in which the process was actually carried out in practice.

*Example I*

A roasted concentrate containing 70% zinc was mixed with a fine coal, briquetted to cylinders of approximately one inch diameters, and deagglomerated to about minus ten mesh. In addition, to the zinc, the ore concentrate contained the following elements or their oxides: 1.3% iron, 0.25% cadmium, 0.05% cuprous oxide, 0.003% arsenic, 0.0008% antimony, 0.01% lead, 3.0% sulphur, 0.4% aluminum oxide, 2.4% silicon dioxide, 2.6% calcium oxide, 1.6% magnesium oxide, and 0.5 ounce of silver per ton.

Eighty-five parts of copper were melted and maintained at a temperature of 2150° F. at the start, the melt temperature being gradually lowered so that at the end of the reaction, the temperature was 2050° F. The ore-carbon mixture was added at five minute intervals for 45 minutes in equal increments. Fifteen minutes were allowed to elapse after the final addition. The melt was poured and the resulting ingot was weighed and analyzed. It was found that 99 parts of brass were recovered which contained 14.1% zinc, 0.5% sulphur and 0.002% silver; no cadmium was found in the ingot. From the condenser 1.6 parts of zinc were recovered, this containing 0.3% cadmium.

The ingot was then remelted, the temperature raised to 2150° F., the pressure above the melt lowered, the melt stirred, and the zinc distilled and condensed. There was recovered 12.1 parts of zinc, leaving 87 parts of brass containing 2.2% zinc.

*Example II*

A melt was made of 226 parts copper and was maintained at 2150° F. at the start of the reduction, the temperature being gradually lowered to 2050° F. at the final stages of the reduction. To this melt were added 92 parts of zinc oxide-carbon briquettes in three equal increments at ten minute intervals. The melt was poured twenty minutes after the last charge was added. On analysis of the melt it was found that 269 parts of brass were obtained containing 16.0% zinc, and 16 parts of residue were obtained containing 60% zinc. From the condenser 4.4 parts of zinc were recovered. In total 75.5% of the zinc was recovered as a brass alloy, 16.8% as unreacted oxide, and 7.5% as distillate.

The brass ingot was remelted and heated to 3200° F. under reducing conditions, and maintained at that temperature for five hours. It was found that 86% of the contained zinc distilled and was recovered as massive metal, while 232 parts of brass were left in the melt, containing 2.5% zinc.

It will be understood that the charge to the melting pot may be initially brass scrap instead of a high grade copper. In this instance, the third step of the process would be practiced first to distill zinc from the brass, and when a 2% zinc brass is achieved, it would be utilized in the second step of the process to serve as the initial reduction medium.

It should also be mentioned that instead of skimming off the ore residue at intervals during the reduction period or at the close of reaction and then immediately commencing the zinc distillation, the melting pot 10 may be detached at joint 22 and the melt poured into a similar pot to effect separation of the residue and the alloy. The distillation of the zinc from the alloy could then be performed in a similar apparatus used only for the zinc distillation. This apparatus could include a very small condenser which is water-cooled for condensing the zinc to massive metal without any melting stage.

As an alternate to condensing to massive metal any zinc vaporized during the second step, the condenser may be partially filled with copper strips, so that the zinc vapor and droplets may react with this metal and form a brass alloy. The temperature of the strips would be kept below the melting point of the brass and above the melting point of the zinc. When the strips build up a sufficiently high content of zinc, they may be added to the melt in the third step and the zinc distilled.

As an alternative to lowering the pressure, the zinc may be evaporated from the base alloy by raising the temperature slowly after the reduction step, so that zinc vapors expel the carbon monoxide from the condenser through the exhaust port 78. The exhaust port 78 is then closed by the valve 80 and the temperature raised at a faster rate to insure continuous vaporization of the zinc.

In addition to zinc ore, other materials may be processed and converted into massive metal according to the present invention. Blue powder, zinc powder, zinc oxide, and badly oxidized zinc scrap may be converted to a high grade product by utilizing the process.

Instead of producing zinc as a massive metal through the following of the entire process as previously described, the process may be terminated at the end of the second step and the brass alloy utilized when required. This may be particularly desirable where the starting zinc material contains essentially only zinc, zinc oxide and copper, and where the base alloy is relatively pure.

In the course of many operational cycles, a quantity of various valuable metals such as gold and silver, as well as impurities, will accumulate in the copper of the melt. It will therefore be desirable to remove the copper from the furnace from time to time and electrorefine it to recover these valuable metals. The pure copper may then be returned to the melting pot or may be sold as a high grade copper and relatively low cost brass may replace it in the melting pot to initiate the process. As to impurities, it will be appreciated that the lead content of the ores should be kept low, since lead will accumulate both in the brass and in the distillate. Sulphur content should also be kept low because of its tendency to accumulate in the copper.

An important feature of the invention is the ability of the process to lend itself to automatic operation. Once the proper procedure has been established for a particular ore, an automatic three-hour cycle can be effected wherein the ore mixture is fed to the copper melt at selected intervals, the plunger reciprocated and rotated at predetermined intervals, the temperature of the copper maintained within a specified cycle, the residue removed at certain intervals, and finally the zinc is distilled. With this cycle completed, the next cycle can be commenced, requiring a minimum of manpower throughout. This makes possible a substantial economy in the operation of the process.

Another economy is realized by the relatively small heat requirements of the process. Once the copper has been heated to the required temperature, the only additional heat requirements are minor and include that required to reduce the zinc oxide, to volatilize the zinc, to replace radiation losses from the melt, and to heat up the gangue.

The space requirements of the required apparatus are also small in respect to the amount of material capable of being processed. Formal batch-type distilling furnaces, for example, have a capacity of 2.2 cubic feet and can hold approximately 110 pounds of ore-coal mixture containing 70% ore of which 70% is zinc. Thus, these furnaces can hold 24.5 pounds of zinc per cubic foot. Considering a cycle in such furnace as being twenty-four hours, this means that 1.02 pounds of zinc per cubic foot can be produced each hour. By contrast, using the process of this application, 19.5 pounds of zinc per cubic foot can be produced each hour.

While specific examples of the process and apparatus have been shown and described herein, it is to be understood that these have been presented for purposes of illustration only and that numerous omissions, changes and additions may be made therein without departing from the spirit and scope of the invention.

What I claim is:

1. A method for producing copper-based zinc alloys comprising the steps of (1) forming an intimate mixture of zinc oxide material and at least sufficient carbon to reduce the zinc oxide to zinc, (2) heating said mixture by submerging the mixture below the surface of a previously prepared body consisting essentially of molten copper, and (3) then indirectly heating said molten body at a temperature between 1900° and 2200° F. for at least 10 minutes to permit the carbon to reduce the zinc oxide to zinc and for the zinc to form with the copper a brass alloy containing up to 16% zinc, said reduction reaction and the formation of said brass alloy taking place entirely below the surface of said body of molten copper.

2. A method as defined in claim 1 wherein said molten body at a temperature of 1900° to 2200° F. is subjected to agitation.

3. A method as defined in claim 1 wherein said zinc oxide material is prepared by roasting a zinc ore.

4. A zinc recovery method comprising the steps of (1) forming an intimate mixture of zinc oxide material and at least sufficient carbon to reduce the zinc oxide to zinc, (2) heating said mixture by submerging the mixture below the surface of a previously prepared body consisting essentially of molten copper, (3) indirectly heating said molten body at a temperature between 1900° and 2200° F. for at least 10 minutes to permit the carbon to reduce the zinc oxide to zinc and for the zinc to form with the copper a brass alloy containing up to 16% zinc, said reduction reaction and the formation of said brass alloy taking place entirely below the surface of said body of molten copper, then (4) indirectly heating the brass alloy to a temperature between 2150° and 3200° F. to vaporize zinc from said brass alloy, and (5) condensing and recovering the vaporized zinc.

5. A method as defined in claim 4 wherein the second heating step is carried out at subatmospheric pressure.

6. A method as defined in claim 4 wherein a closed carbon-lined system is employed to avoid oxidation of the zinc being recovered.

References Cited in the file of this patent

UNITED STATES PATENTS

| | | |
|---|---|---|
| 291,410 | Sebillot | Jan. 1, 1884 |
| 1,331,740 | Berglund | Feb. 24, 1920 |
| 1,659,445 | Schmeller | Feb. 14, 1928 |
| 1,728,681 | Johannsen | Sept. 17, 1929 |
| 2,000,833 | Freise | May 7, 1935 |
| 2,070,101 | Weaton | Feb. 9, 1937 |
| 2,264,288 | Betterton et al. | Dec. 2, 1941 |
| 2,426,389 | Chew | Aug. 26, 1947 |
| 2,598,745 | Handwerk | June 3, 1952 |
| 2,776,881 | Thomsen | Jan. 8, 1957 |
| 2,920,951 | Bretschneider et al. | Jan. 12, 1960 |